United States Patent
Jennings

(10) Patent No.: US 10,151,558 B2
(45) Date of Patent: Dec. 11, 2018

(54) HUNTER SAFETY DEVICE AND SYSTEM FOR RIFLES AND SHOTGUNS CALLED NEVER DROP

(71) Applicant: James Jennings, Anderson, IN (US)

(72) Inventor: James Jennings, Anderson, IN (US)

( * ) Notice: Subject to any disclaimer, the term of this patent is extended or adjusted under 35 U.S.C. 154(b) by 0 days.

(21) Appl. No.: 15/822,101

(22) Filed: Nov. 24, 2017

(65) Prior Publication Data

US 2018/0142986 A1    May 24, 2018

Related U.S. Application Data

(60) Provisional application No. 62/426,171, filed on Nov. 23, 2016.

(51) Int. Cl.

| | |
|---|---|
| *F41C 23/02* | (2006.01) |
| *F41C 27/00* | (2006.01) |
| *F41A 35/00* | (2006.01) |
| *F16B 21/07* | (2006.01) |
| *F41A 23/18* | (2006.01) |

(52) U.S. Cl.
CPC .......... *F41C 27/00* (2013.01); *F16B 21/071* (2013.01); *F41A 23/18* (2013.01); *F41A 35/00* (2013.01); *F41C 23/02* (2013.01)

(58) Field of Classification Search
CPC ........ F41C 23/02; F41C 27/00; F41C 33/002; F41A 35/00; F41A 23/18; F16B 21/071
USPC ......... 294/148–151, 165, 219; 224/149, 150, 224/913, 916
See application file for complete search history.

(56) References Cited

U.S. PATENT DOCUMENTS

| | | | | |
|---|---|---|---|---|
| 4,299,343 A | * | 11/1981 | Atchisson | F41C 33/00 224/149 |
| 4,441,748 A | * | 4/1984 | St. Germain | B66C 1/122 294/74 |
| 4,553,779 A | * | 11/1985 | Shortridge | A63C 11/025 224/917 |
| 4,760,944 A | * | 8/1988 | Hughes | F41C 33/00 124/23.1 |
| 5,265,365 A | * | 11/1993 | Finn | F41C 23/00 224/239 |
| 5,325,618 A | * | 7/1994 | Turner | F41A 17/08 224/149 |
| 6,019,404 A | * | 2/2000 | Pasquale | F41A 17/44 224/150 |

(Continued)

*Primary Examiner* — Dean J Kramer
(74) *Attorney, Agent, or Firm* — Ritchison Law Offices, PC; John D Ritchison

(57) ABSTRACT

A hunter safety device for transporting firearms from ground level to an elevated position. It attaches to the stock of a weapon which is in turn attached a sling. A tether attaches the weapon from the sling to an elevated platform position. Once installed, it prevents a falling weapon from contacting the ground. The device consists of three layers including an inner layer made of a non-slip material interior, a middle layer made of a tough type of material, an outside/exterior layer made of a durable material such as vinyl, for the exterior to be exposed to atmosphere, and a closure mechanism; an edge method like sewing or adhesive which secures the three layers; and an elastic strap encircles the three layers. The tether strap then is connected to the layers at one end and to a tree/tree stand at the other to safely secure the weapon.

8 Claims, 7 Drawing Sheets

(56) References Cited

U.S. PATENT DOCUMENTS

Figure 1:
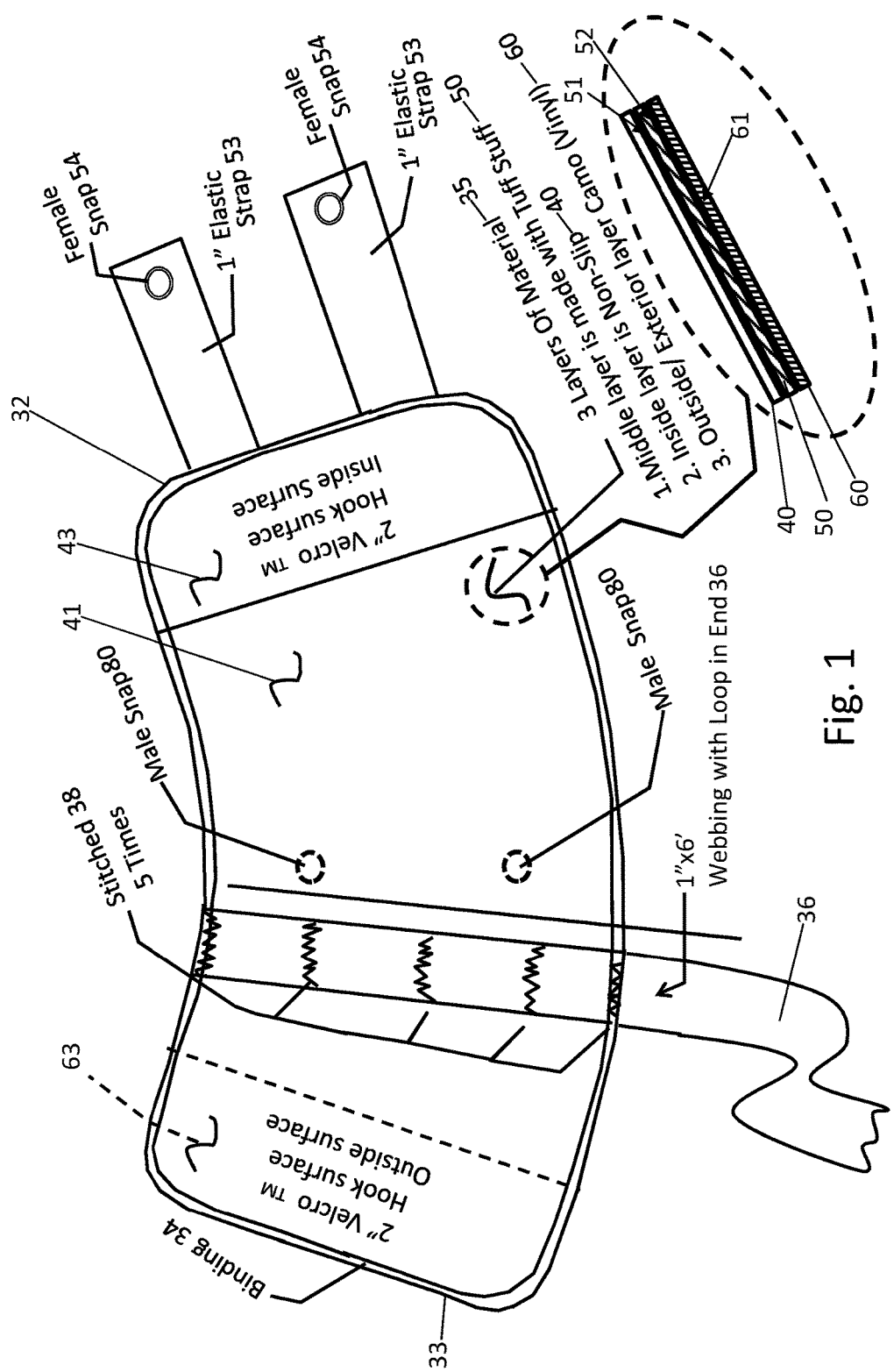

| | | | |
|---|---|---|---|
| 6,988,755 B2* | 1/2006 | Lukas | F41A 35/00 224/913 |
| 2007/0094910 A1* | 5/2007 | Sisson | F41A 17/00 42/85 |
| 2008/0018122 A1* | 1/2008 | Zierler | F41C 23/02 294/74 |

* cited by examiner

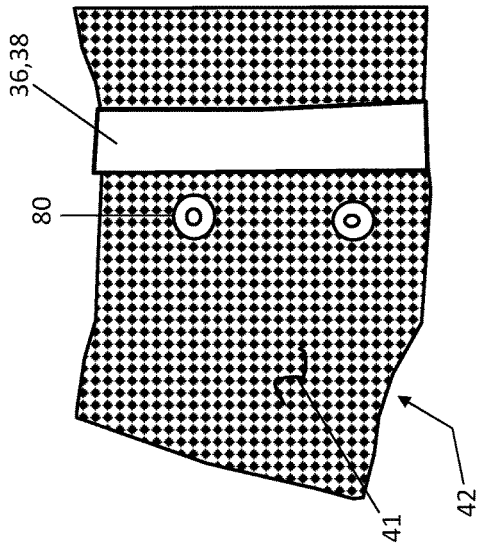
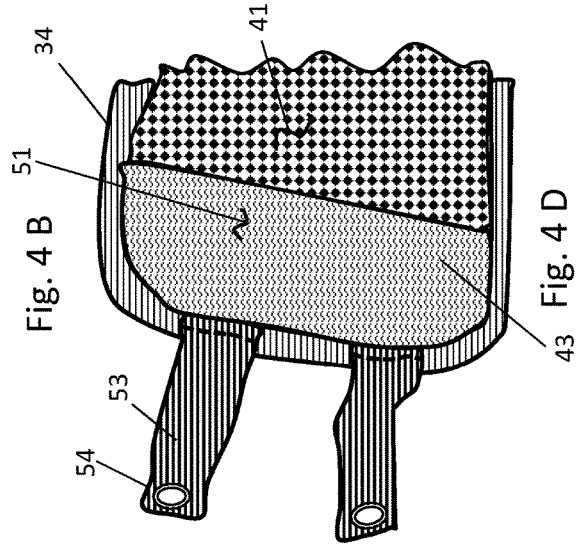
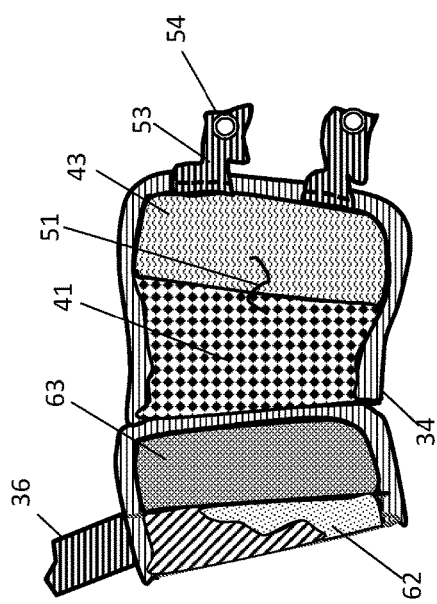
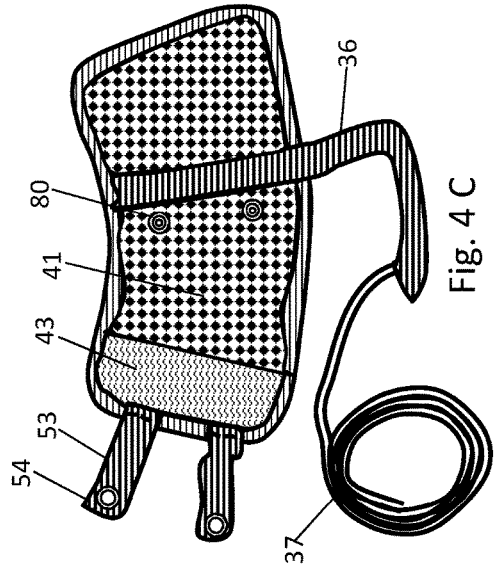
Fig. 4 A
Fig. 4 B
Fig. 4 C
Fig. 4 D

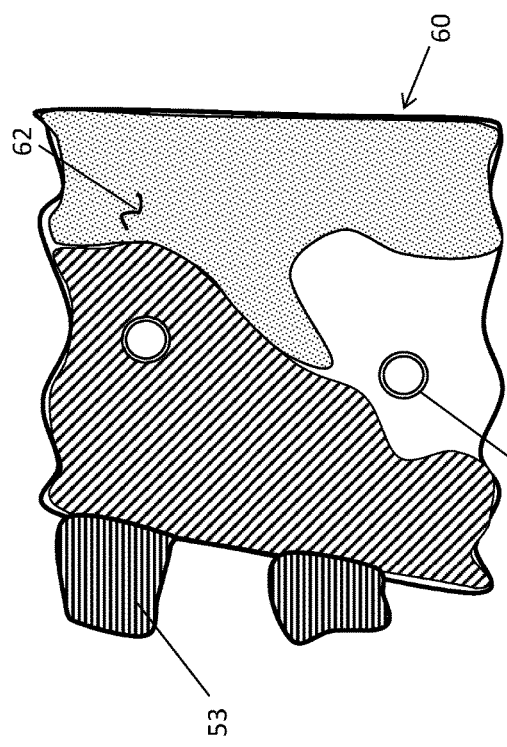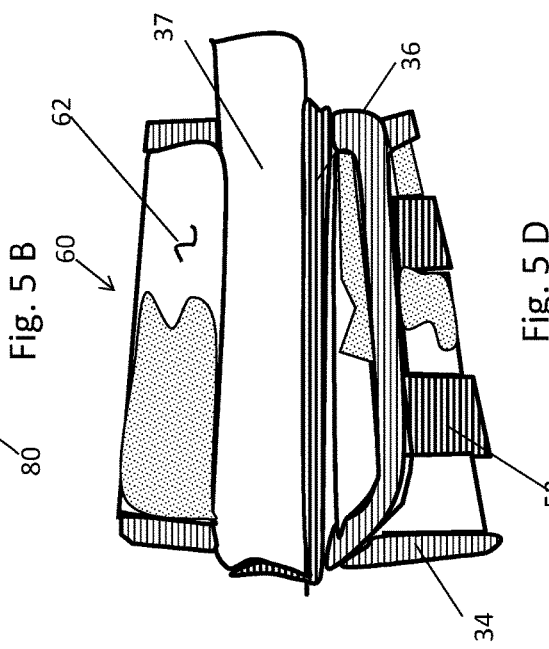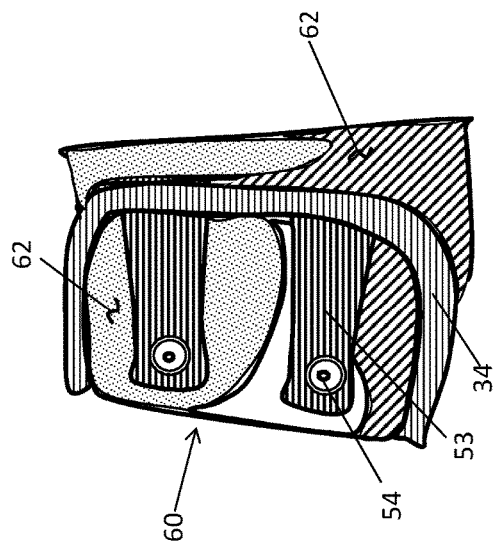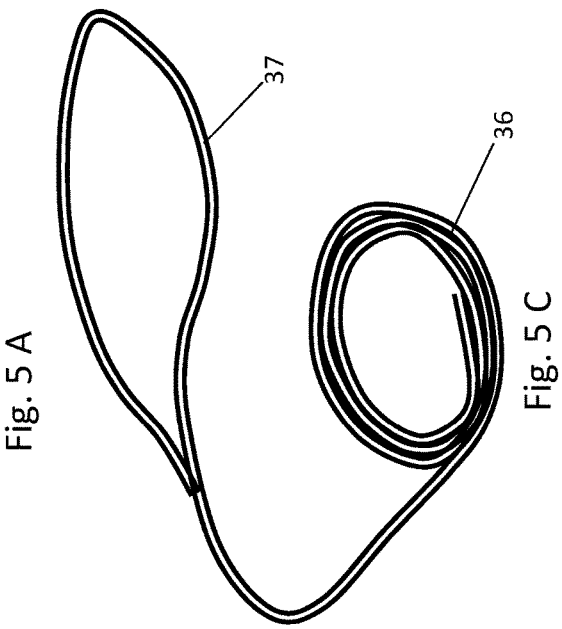
Fig. 5 A
Fig. 5 B
Fig. 5 C
Fig. 5 D

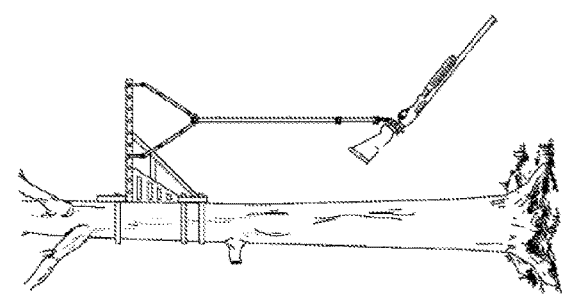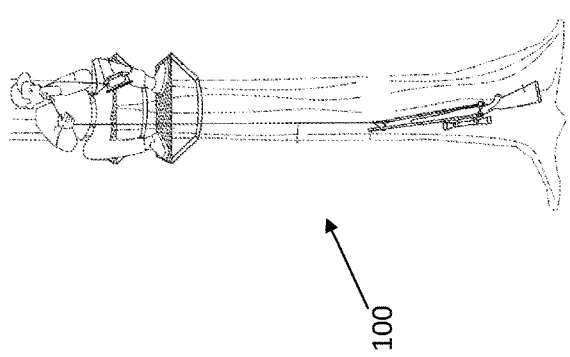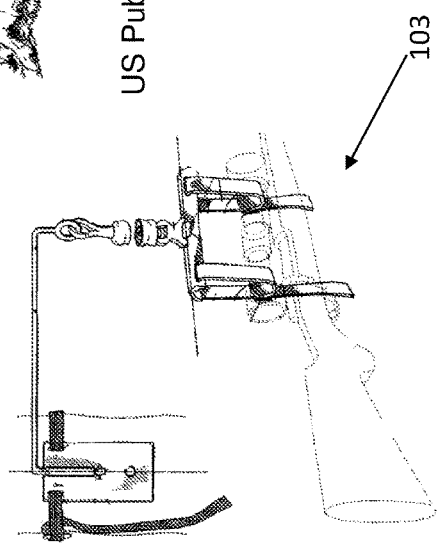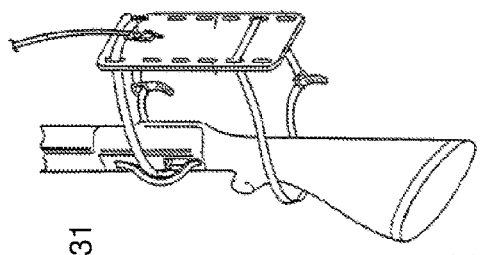
All Sketches Prior Art
Fig. 7 A
US Pub 2001/0022331
Prior Art
Fig. 7 B
US Pub 2007/0094910
Prior Art
Fig. 7 C
US Pat 6988755
Prior Art
Fig. 7 D
US Pat 5685103
Prior Art

HUNTER SAFETY DEVICE AND SYSTEM FOR RIFLES AND SHOTGUNS CALLED NEVER DROP

CROSS-REFERENCE TO RELATED APPLICATIONS

This application claims the benefit of United States Provisional Patent Application Ser. No. 62/426,171 filed Nov. 23, 2016, by James Jennings and entitled "Special hunter safety device/system for rifles and shotguns called Never Drop".

FIELD OF INVENTION

This invention, a hunter safety device and system for long weapons like rifles and shotguns called "Never Drop" is directed to an attaching device for attachment to the butt stock of a shotgun, rifle or the like and to which is in turn attached a shotgun or rifle sling. This invention relates generally to a tether apparatus for a weapon and more specifically to a tether apparatus that attaches the weapon to an elevated platform such as a hunting stand and that will prevent a falling weapon from contacting the ground or the platform and reduce the forces acting on the weapon when the weapon is dropped from the platform. This invention relates to the technical field of (and is not limited to) an apparatus for use with a firearm and for use with an elongated stationary object (particulars a rifle or shotgun), in which the apparatus includes a wrap-a-round clamping device with a tether and connectable to a butt stock on the firearm. A firearm is a portable gun, being a barreled weapon that launches one or more projectiles often driven by the action of an explosive force. Most modern firearms have rifled barrels to impart spin to the projectile for improved flight stability (for improved accuracy of shot). A rifle is a firearm designed to be fired from the shoulder, with a barrel that has a helical groove or pattern of grooves (rifling) cut into the barrel walls. Rifles are used in hunting and shooting sports.

The present invention relates to hunting equipment and accessories. More particularly, the present invention relates to a gun safety device for transporting firearms, rifles, shot guns, and equipment from ground level to an elevated hunting position. The present invention relates generally to a supporting harness for a firearm and, specifically, for a firearm harness which enables the firearm to be hoisted vertically to an elevated position such as a hunter's tree stand.

FEDERALLY SPONSORED RESEARCH

None.

SEQUENCE LISTING OR PROGRAM

None.

BACKGROUND

Hunters commonly employ elevated platforms that offer an expanded view of a surrounding area and concealment from their prey. Such platforms can be a tree stand, deer blind, or other elevated structures. While offering a significant hunting advantage, elevated platforms cause some concern regarding weapon safety. If a hunter were to drop a weapon, such as a rifle, from a tree stand, for example, it could discharge upon striking the ground or other object and potentially cause injury to the hunter. Throughout the realm of hunting activities, sportsmen and sportswomen have commonly encountered difficulty in transporting their firearms such as rifles or shot guns, from the ground to a hunting stand or an elevated position. Techniques used in the prior art include many unsafe and cumbersome procedures. For example, some hunters tie a rope to their firearm, climbing to their respective hunting stand or elevated position with the rope in hand, and thereafter lifting the firearm or archery bow or other hunting equipment with the rope, running the risk that an expensive firearm may be damaged and/or the firearm may accidentally discharge while being juggled about during this lifting operation. In addition, other hunters attempt to climb to the hunting stand with a firearm thrown over the shoulder, consequently subjecting the hunter to the risk of damaging the firearm while climbing, dropping the firearm or perhaps more seriously, having the firearm inadvertently discharge or subjecting the hunter to potential injury should he or she fall upon the firearm while climbing to the hunting stand.

Many states now allow hunting from elevated positions that is above ground level such as through the use of tree stands or elevated platforms. When a hunter engages in this sport it is necessary for the hunter to safely and easily move himself or herself, firearms, archery bows and equipment to and from the elevated position. Several prior devices are known which allows a hunter to climb while carrying their equipment by way of slings, backpacks or simply holding equipment in their hands. All of these methods are dangerous and cumbersome. It is recognized that a safer approach to hoisting firearms and hunting equipment to an elevated position is needed. Simply attaching a rope or cord to a firearm often resulted in damage to the equipment and in addition put the hunter's safety at risk. In other occasions firearms have been tied off through the trigger housing allowing the gun to flip over and discharge. Hunters often go to and from their hunting spots in the dark or in near dark conditions. Darkness and cold weather interfere with the hunter's ability to properly tie a firearm or archery bow for safe lifting from the ground to an elevated position. Since hunters may travel long distances and over rough terrain in search of game, it is important that the hunter's tree stand or other accessories the hunter may use be highly portable, i.e. lightweight and compact.

When a hunters uses a tree stand, he or she attaches a harness of some type to the firearm and a hoist line to the harness. The hunter then climbs into the stand without the firearm but carrying the hoist line. After assuming a safe position in the tree stand, the hunter pulls the firearm up to the stand with the hoist line. Since the firearm is laying on the ground prior to hoisting up to the stand, prior art harness and hoisting devices support the firearm so that the muzzle end of the barrel is pulled up first. This prevents dirt or debris from getting into the barrel or otherwise nicking or scratching the muzzle end of the barrel. This also means that the muzzle of the firearm faces the hunter as the firearm is hoisted. Ideally, the firearm is not loaded during the hoisting procedure if the hunter is following standard safety practices. However, one of the primary safety rules is to never handle a firearm so that it is pointed at you, even if you believe the firearm to be "unloaded".

Problems Addressed

It is, therefore, a principal object of the present invention to improve a harness apparatus for a firearm or other weapon which enables them to be protected butt end first after the hunter is positioned in the tree/tree stand while protecting the muzzle end of the barrel. A further object of the invention is the provision of a firearm harness which is simple in construction and easy to apply to and easy to remove from a firearm. Another object of the invention is the provision of an efficient and relatively simple method of constructing and assembling a firearm harness which is capable of a long life of useful service. It is important that the hunter's tree stand or other accessories the hunter may use be highly portable, i.e. lightweight and compact. Additionally, an apparatus is needed that will prevent the weapon from striking the ground if the weapon is dropped by the hunter. The apparatus should further reduce the forces acting on the weapon to prevent the weapon from accidentally discharging. With these and other objects in view, as will be apparent to those skilled in the art, the invention resides in the combination of parts set forth in the specification and covered by the claims appended hereto.

PRIOR ART

Typical accessory and correlating components used with sling attaching devices of the type to which the present invention is directed can be found in several patents and publications. A novelty search provided the following group of inventions. As far as known, there are no patents or publications that anticipate the Never Drop device. Likewise, the references alone or in conjunction and view of other inventions fail to make the new device obvious in the eyes of a person skilled in the art of this invention. A U.S. Pat. No. 9,417,025 names an Apparatus Having Clamp Device and Forestock-Support Member for Firearm was issued to McDonald in 2016. A US Patent application 2007/0094910 called a Tether Apparatus for a Weapon was submitted by Sisson et al. U.S. Pat. No. 6,988,755 entitled Gun Gurney issued to Lukas back in 2006. Another U.S. Pat. No. 6,726,163 named a Hunter's Shooting Rest and Method of Using Same issued to Eppard et al. in 2004. Further a US Application 2001/0022331 was submitted by Smith for review and was called Apparatus and Method for Storing Line and Hoisting Articles. Still a different U.S. Pat. No. 6,019,404 was named Hoisting Harness for a Firearm and issued to Pasquale in 2000. A U.S. Pat. No. 5,769,372 entitled Hunting Weapon Holder issued to Klosterman in 1998. Further issued US Patent Nos. include U.S. Pat. No. 5,575,411 called a Butt Stock Sling Attaching Device For A Shotgun issued to Hightower in 1996, U.S. Pat. No. 3,022,898 called a Gun Holder issued to H. Loeb in 1960, and finally U.S. Pat. No. 1,332,088 named a Gun Sling issued to H. S. Wagner in 1920.

SUMMARY OF THE INVENTION

This invention is a hunter safety device and system for rifles and shotguns called "Never Drop". The preferred hunter safety device and system for rifles and shotguns called "Never Drop" that is comprised of: (a) a set of three layers of the device, the layers further comprising: (1). An inside layer comprised of non-slip material with an inner surface of inner layer contiguous to butt; an exterior surface of inner layer, surface contiguous to inner surface of middle layer, and a Velcro (Reg. Trademark) Hook structure or equal; (2). A middle layer comprised of tough, durable, tuff-stuff or equal type of material with an inner surface of middle layer, surface contiguous to exterior surface of inner layer and an exterior surface of middle layer, surface contiguous to inner surface of outside layer contiguous to exterior surface of middle layer; (3). An outside/exterior layer comprised of durable material such as vinyl, canvas or the like with an inner surface of outside layer contiguous to exterior surface of middle layer and with an exterior surface of outside layer exposed to atmosphere and further having a Velcro (Reg. Trademark) loop structure or equal; (4). An edge means for connecting the three layers such a sewing, adhesive or the like; and (5) an elastic strap with end and opposite end, the strap having a means to connect to the set of three layers a one end and a female snap at the opposite end; (b) a tether strap and loop; and (c) a means for connecting the tether strap to the layers wherein the general device 31 is wrapped around a butt of a long or bulky types of weapons and equipment and secured with Velcro and snaps and the device 31 may be connected to a tree/tree stand by the tether strap and loop to safely secure the weapon or equipment.

The newly invented hunter safety device and system for rifles and shotguns called "Never Drop" may be manufactured at low volumes by very simple means and in high volume production by more complex and controlled systems.

ADVANTAGES

There are several advantages of the A hunter safety device and system for rifles and shotguns called "Never Drop" device. There are currently no known hunter safety device/system for rifles and shotguns that are effective at providing the objects of this invention. The hunter safety device and system for rifles and shotguns called "Never Drop" has various advantages and benefits:

| Item | Advantages |
| --- | --- |
| 1 | keeps weapon or equipment controlled by hunter (slip/sleep) |
| 2 | prevents drop to ground from stand |
| 3 | maintains muzzle down to ground if falls |
| 4 | is small, compact, and light weight |
| 5 | grips butt on interior side |
| 6 | has camouflaged exterior |
| 7 | is made of durable materials |
| 8 | can be an inexpensive safety device |

Finally, other advantages and additional features of the A hunter safety device and system for rifles and shotguns called "Never Drop" will be more apparent from the accompanying drawings and from the full description of the device. For one skilled in the art of firearms and accessories

DESCRIPTION OF THE DRAWINGS—FIGURES

FIG. 1 is a sketch of the general hunter safety gun wrap device for rifle and shotgun applications with components and features shown.

Figure 2:
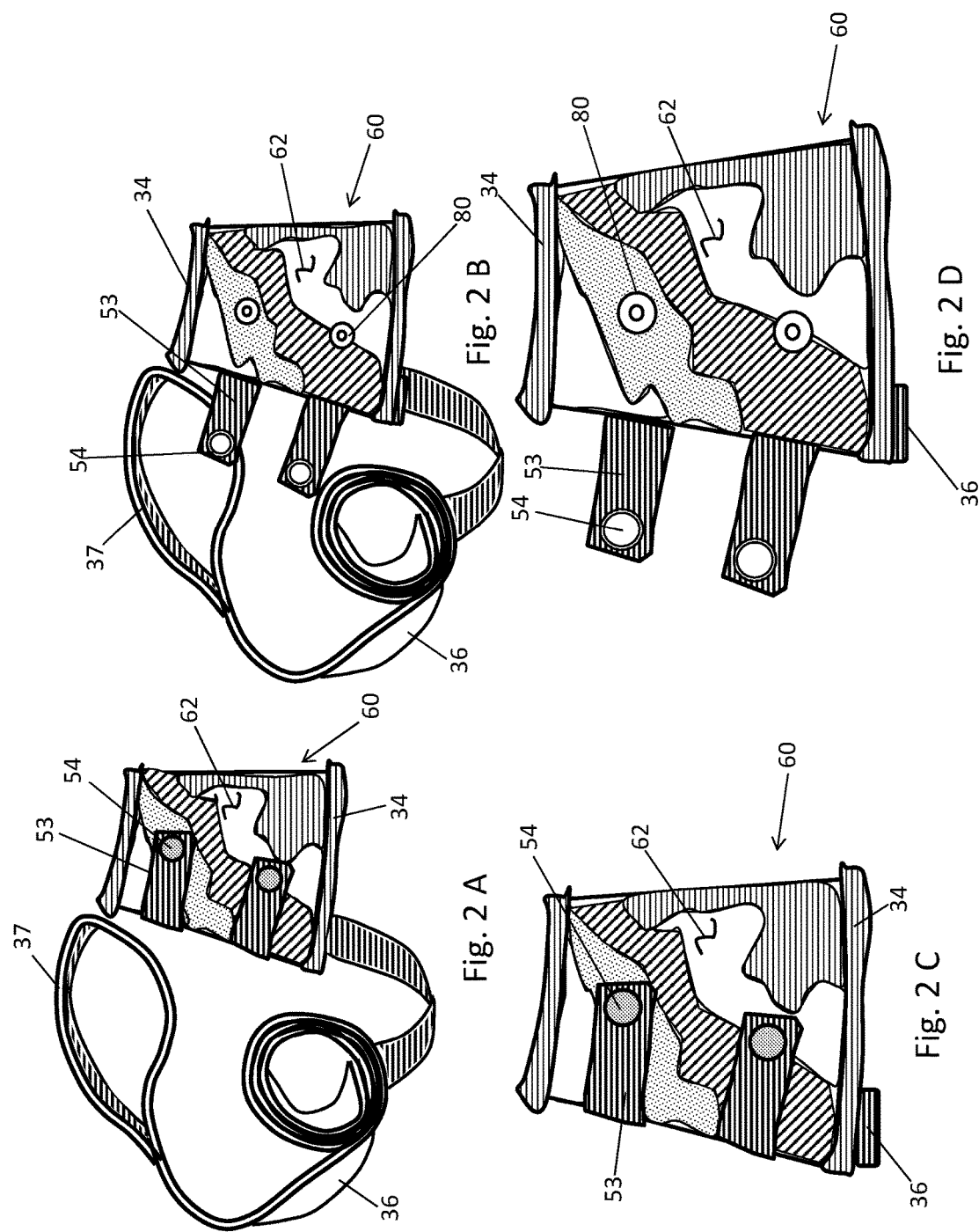

FIGS. 2 A through 2 D are sketches of the general hunter safety gun wrap device in a closed position with components and features noted viewed from the "snap" side.

Figure 3:
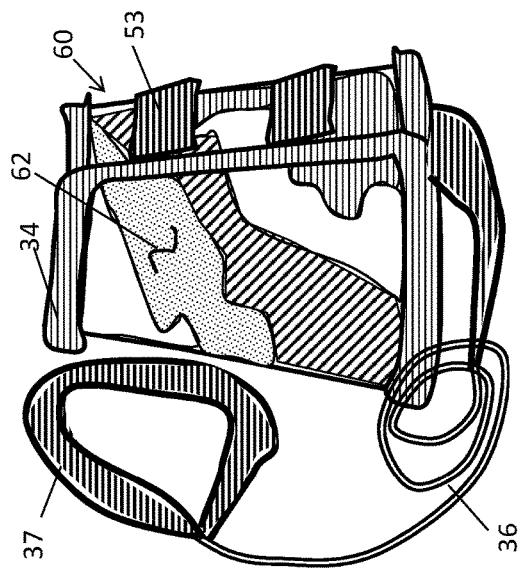
Figure 3:
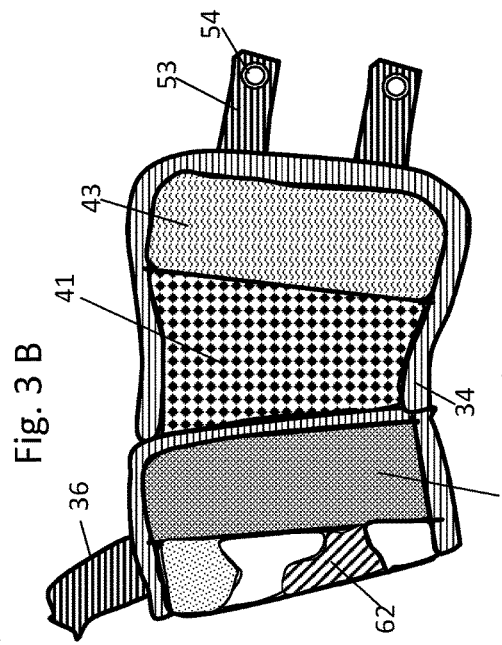
Figure 3:
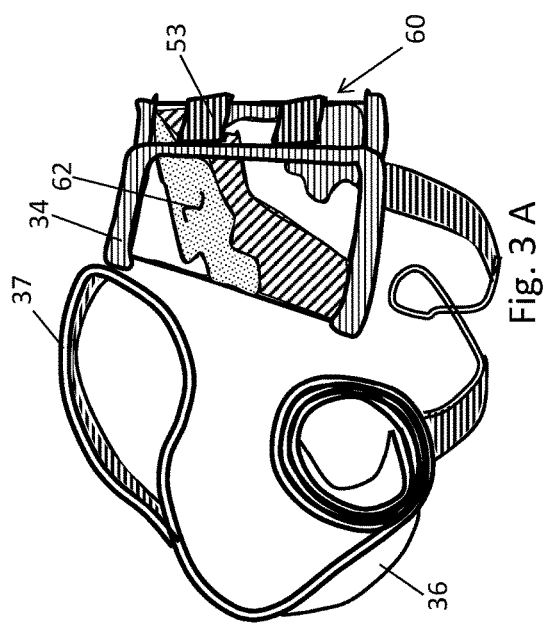
Figure 3:
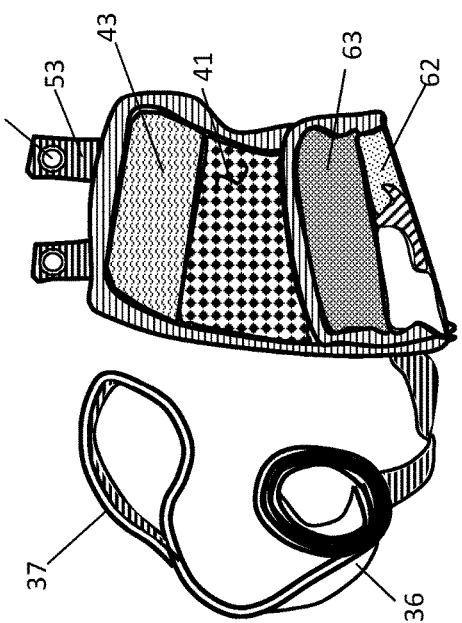

FIG. 3 A through 3 D are sketches of the hunter safety gun wrap device in a closed and open position with the components and features shown from generally a side opposite to the snaps.

FIGS. 4 A through 4 D are sketches of the hunter safety gun wrap device in an open position showing the surface next to the rifle butt.

FIGS. 5 A through 5 D are sketches of the hunter safety gun wrap device generally from the snap side.

Figure 6:
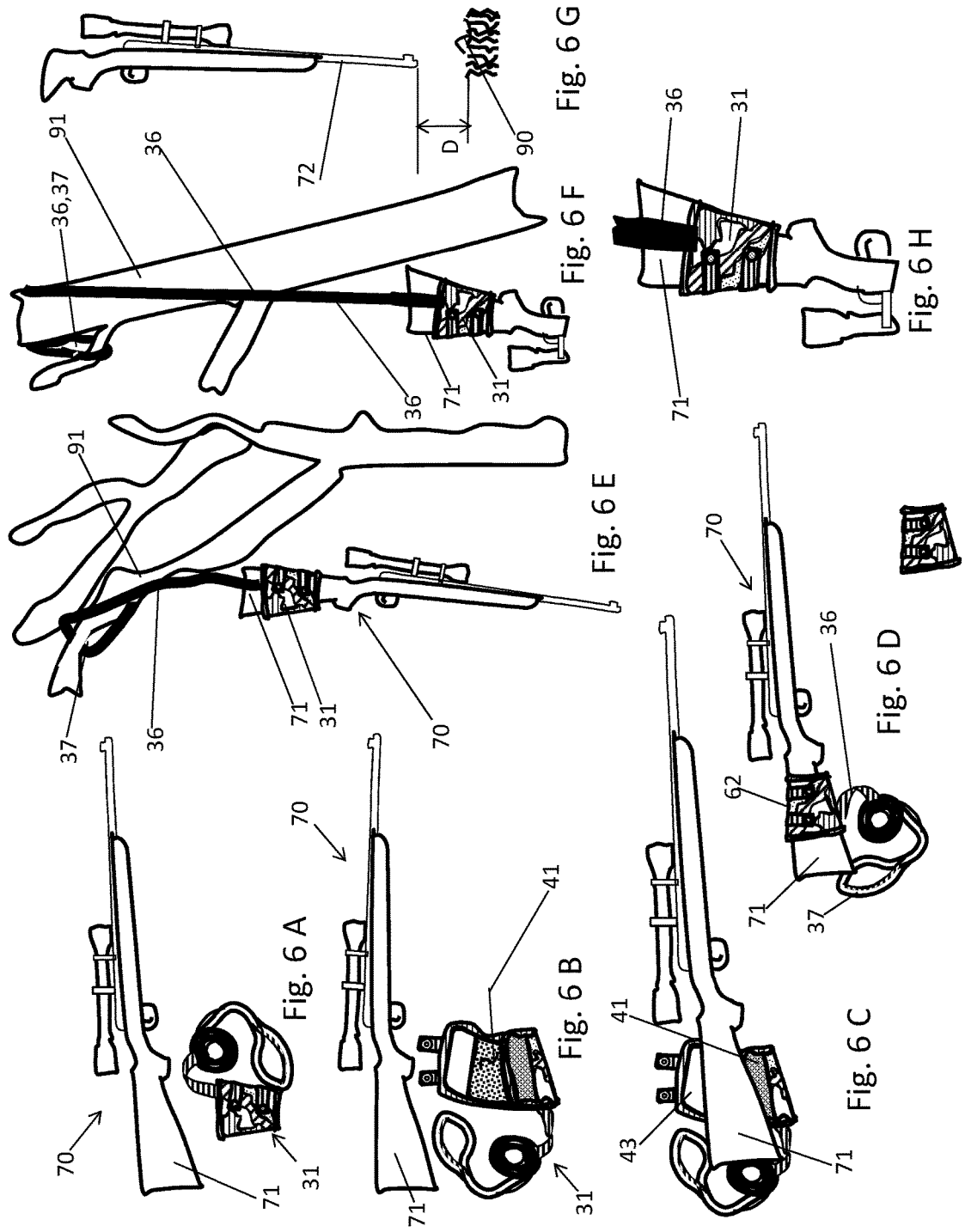

FIGS. 6 A through 6 H are sketches of the hunter safety gun wrap device showing operation and use views.

FIGS. 7 A through 7 D are sketches of the prior art for other gun safety devices.

DESCRIPTION OF THE DRAWINGS—REFERENCE NUMERALS

The following list refers to the drawings and their Reference numbers

| Ref # | Description |
|---|---|
| 31 | general hunter safety gun wrap device 31 and more particularly a hunter safety device and system for rifles and shotguns called "Never Drop" |
| 32 | strap end 32 |
| 33 | covering end 33 |
| 34 | edge means to connect 34 such as sewn binding |
| 35 | layers 35 of the device |
| 36 | tether strap 36 |
| 37 | loop 37 on tether strap 36 |
| 38 | means for connecting 38 tether strap 36 to inner surface 40 such as sewing or adhesive |
| 40 | inside layer 40 comprised of non-slip material such as thin, solid natural rubber and synthetic rubber, open crisscross solid natural rubber and synthetic rubber, open sticky composite material, ribbed solid natural rubber, synthetic rubber, and composite materials |
| 41 | inner surface 41 of inner layer 40 contiguous to butt 71 |
| 42 | exterior surface 42 of inner layer 40, surface contiguous to inner surface 51 of middle layer 50 |
| 43 | Velcro (Reg. Trademark) Hook and structure 43, snaps, clasps, or equal closure mechanism |
| 50 | middle layer 50 comprised of tough, durable, tuff-stuff, durable composite sheet, thin nylon sheet, or equal type of durable material |
| 51 | inner surface 51 of middle layer 50, surface contiguous to exterior surface 42 of inner layer 40 |
| 52 | exterior surface 52 of middle layer 50, surface contiguous to inner surface 61 of outside layer 60 contiguous to exterior surface 52 of middle layer 50 |
| 53 | elastic strap 53 |
| 54 | female snap 54 or means for connecting ends of strap 53 such as snaps, hooks, clasps, |
| 60 | outside/exterior layer 60 comprised of durable material such as vinyl, canvas, composite material or the like |
| 61 | inner surface 61 of outside layer 60 contiguous to exterior surface 52 of middle layer 50 |
| 62 | exterior surface 62 of outside layer 60 exposed to atmosphere |
| 63 | another closure mechanism like Velcro (Reg. Trademark) loop structure 63, snaps, clasps, or hook and eyes, or equal |
| 70 | long or bulky types of weapons and equipment 70 for example, and not as limitations, the following: rifles, shotguns, long bows, cross bows, telescopes and game spotter, cameras and spotlights. rifle or shotgun |
| 71 | butt 71 of rifle or shotgun 70 |
| 72 | muzzle 72 of weapon 70 |
| 80 | male snap 80 connected between inner surface 41 of inside layer 40 and outer surface 62 of outer layer 60 |
| 90 | ground 90 |
| 91 | tree or tree stand 91 |
| D | distance D from muzzle 72 to ground 90 |

-continued

| Ref # | Description |
|---|---|
| 100 | prior art 100 publication US2001/0022331 |
| 101 | prior art 101 patent 6988755 |
| 102 | prior art 102 publication US2007/0094910 |
| 103 | prior art 103 patent 5685103 |

DETAILED DESCRIPTION OF PREFERRED EMBODIMENT

This invention, a hunter safety device and system for rifles and shotguns called "Never Drop" is directed to an attaching device for attachment to the butt stock of a shotgun, rifle or the like and to which is in turn attached a shotgun or rifle sling. This invention relates generally to a tether apparatus for a weapon and more specifically to a tether apparatus that attaches the weapon to an elevated platform such as a hunting stand and that will prevent a falling weapon from contacting the ground or the platform and reduce the forces acting on the weapon when the weapon is dropped from the platform. This invention relates to an elongated stationary object (particulars a rifle or shotgun), in which the apparatus includes a wrap-a-round clamping device with a tether and connectable to a butt stock on the firearm. The present invention relates to hunting equipment and accessories. More particularly, the present invention relates to a gun safety device for transporting firearms, rifles, and shot guns and equipment from ground level to an elevated hunting position. The present invention relates generally to a harness for a firearm and, specifically, for a firearm harness which enables the firearm to be hoisted vertically to an elevated position such as a hunter's tree stand. The applications anticipate original equipment with rifles and shotguns or as aftermarket uses described and discussed below.

The advantages for the hunter safety device and system for rifles and shotguns called "Never Drop" 31 are listed above in the introduction. Succinctly the benefits are that the device:

keeps weapon controlled by hunter (slip/sleep)
prevents drop to ground from stand
maintains muzzle down to ground if falls
is small, compact, and light weight
grips butt on interior side
has camouflaged exterior
is made of durable materials
can be an inexpensive safety device The preferred hunter safety device and system 31 for rifles and shotguns called "Never Drop" that is comprised of: (a) three layers 35 of the device 31, the layers 35 further comprising: (1). An inside layer 40 comprised of non-slip material such as thin, solid natural rubber and synthetic rubber, open crisscross solid natural rubber and synthetic rubber, open sticky composite material, ribbed solid natural rubber, synthetic rubber, and composite materials with an inner surface 41 of inner layer 40 contiguous to butt 71; an exterior surface 42 of inner layer 40, surface contiguous to inner surface 51 of middle layer 50, and a Velcro (Reg. Trademark) Hook structure 43 or equal; (2). A middle layer 50 comprised of tough, durable, tuff-stuff, durable composite sheet, thin nylon sheet, or equal type of thin durable sheet material with an inner surface 51 of middle layer 50, surface 51 contiguous to exterior surface 42 of inner layer 40 and an exterior surface 52 of middle layer 50, surface contiguous to inner surface 61 of outside layer 60 contiguous to exterior surface 52 of middle layer 50; (3). An outside/exterior layer 60 comprised of durable material such as vinyl, canvas or the like with an inner surface 61 of outside layer 60 contiguous to exterior surface 52 of middle layer 50 and with an exterior surface 62 of outside layer 60 exposed to atmosphere and further having a Velcro (Reg. Trademark) loop structure 63, closing mechanism, or equal; (4). An edge means for connecting the three layers 35 such a sewing, adhesive or the like; and (5) an elastic strap 53 with end 32 and end 33, the strap 53 having a means to connect to the three layers 35 a one end and a female snap 54 at the opposite end; (b) a tether strap 36 and loop 37; and (c) a means for connecting the tether strap 36 to the layers 35 wherein the general device 31 is wrapped around a butt 71 of a weapon or bulky equipment 70 and secured with Velcro and snaps and the device 31 may be connected to a tree/tree stand 90 by the tether strap 36 and loop 37 to safely secure the gun 70.

There is shown in FIGS. 1-7 a complete description and operative embodiment of the hunter safety device and system for rifles and shotguns called "Never Drop". In the drawings and illustrations, one notes well that the FIGS. 1-7 demonstrate the general configuration and use of this product. The various example uses are in the operation and use section, below.

The accompanying drawings, which are incorporated in and constitute a part of this specification, illustrate an embodiment of the hunter safety device and system for rifles and shotguns 33 that is preferred. The drawings together with the summary description given above and a detailed description given below serve to explain the principles of the hunter safety device and system 31 for rifles and shotguns. It is understood, however, that the device 31 is not limited to only the precise arrangements and instrumentalities shown. Other examples of safety wrap-a-round and tethered devices and uses are still understood by one skilled in the art of gun safety devices to be within the scope and spirit shown here.

FIG. 1 is a sketch of the general hunter safety gun wrap device for rifle and shotgun applications with components and features shown. Demonstrated in this figure are: a general hunter safety gun wrap device 31 and more particularly a hunter safety device and system for rifles and shotguns called "Never Drop"; strap end 32; covering end 33; edge means to connect 34 such as sewn binding; layers 35 of the device 31; tether strap 36; means for connecting 38 tether strap 36 to inner surface 40; inside layer 40 comprised of non-slip material such as thin, solid natural rubber and synthetic rubber, open crisscross solid natural rubber and synthetic rubber, open sticky composite material, ribbed solid natural rubber, synthetic rubber, and composite materials; inner surface 41 of inner layer 40 contiguous to butt 71; Velcro (Reg. Trademark) Hook structure 43 or equal; middle layer 50 comprised of tough, durable, tuff-stuff or equal type of durable material; elastic strap 53; female snap 54 or means for connecting ends of outside/exterior layer 60 comprised of durable material such as vinyl, canvas or the like; Velcro (Reg. Trademark) loop structure 63 or equal; and male snap 80 connected between inner surface 41 of inside layer 40 and outer surface 62 of outer layer 60.

FIGS. 2 A through 2 D are sketches of the general hunter safety gun wrap device 31 in a closed position with components and features noted viewed from the "snap" side. In these views are shown: an edge means to connect 34 such as sewn binding; tether strap 36; loop 37 on tether strap 36; elastic strap 53; female snap 54 or means for connecting ends of strap 53; an outside/exterior layer 60 comprised of durable material such as vinyl, canvas or the like; an exterior surface 62 of outside layer 60 exposed to atmosphere; and a male snap 80 connected between inner surface 41 of inside layer 40 and outer surface 62 of outer layer 60.

FIG. 3 A through 3 D are sketches of the hunter safety gun wrap device 31 in a closed and open position with the components and features shown from generally a side opposite to the snaps. Provided here are examples of: an edge means to connect 34 such as sewn binding; a tether strap 36; a loop 37 on tether strap 36; an inner surface 41 of inner layer 40 contiguous to butt 71; a Velcro (Reg. Trademark) Hook structure 43 or equal; an elastic strap 53; a female snap 54 or means for connecting ends of strap 53; an outside/exterior layer 60 comprised of durable material such as vinyl, canvas or the like; an exterior surface 62 of outside layer 60 exposed to atmosphere; and a Velcro (Reg. Trademark) loop structure 63 or equal.

FIGS. 4 A through 4 D are sketches of the hunter safety gun wrap device 31 in an open position showing the surface 41 next to the rifle butt 71. In these views, one sees: an edge means to connect 34 such as sewn binding; a tether strap 36; a loop 37 on tether strap 36; a means for connecting 38 tether strap 36 to inner surface 40; an inner surface 41 of inner layer 40 contiguous to butt 71; a Velcro (Reg. Trademark) Hook structure 43 or equal; an elastic strap 53; a female snap 54 or means for connecting ends od strap 53; a Velcro (Reg. Trademark) loop structure 63 or equal; and a male snap 80 connected between inner surface 41 of inside layer 40 and outer surface 62 of outer layer 60.

FIGS. 5 A through 5 D are sketches of the hunter safety gun wrap device 31 generally from the snap 80 side. Components demonstrated are: an edge means to connect 34 such as sewn binding; a tether strap 36; a loop 37 on tether strap 36; an elastic strap 53; a female snap 54 or means for connecting ends of strap 53; an outside/exterior layer 60 comprised of durable material such as vinyl, canvas or the like; an exterior surface 62 of outside layer 60 exposed to atmosphere; and a male snap 80 connected between inner surface 41 of inside layer 40 and outer surface 62 of outer layer 60.

FIGS. 6 A through 6 H are sketches of the hunter safety gun wrap device showing operation and use views. This is explained below in the operations section.

FIGS. 7 A through 7 D are sketches of the prior art for other gun safety devices. Here former patents and applications for various other hunter safety device and system for rifles and shotguns. These include: prior art 100 publication US2001/0022331; prior art 101 U.S. Pat. No. 6,988,755; prior art 102 publication US2007/0094910; and prior art 103 U.S. Pat. No. 5,685,103. As can be seen, the hunter safety device and system 31 for rifles and shotguns called "Never Drop" is a unique combination and use as described herein.

The details mentioned here are exemplary and not limiting. Other specific components and manners specific to describing a hunter safety device and system 31 for rifles and shotguns called "Never Drop" may be added as a person having ordinary skill in the field of the gun safety devices and their uses.

OPERATION OF THE PREFERRED EMBODIMENT

The hunter safety device and system 31 for rifles and shotguns called "Never Drop" has been described in the above embodiment. The manner of how the device operates is described below. One notes well that the description above and the operation described here must be taken together to fully illustrate the concept of the device 31. The preferred hunter safety device and system 31 for rifles and shotguns called "Never Drop" that is comprised of:

(a) three layers 35 of the device 31, the layers 35 further comprising: (1). An inside layer 40 comprised of non-slip material with an inner surface 41 of inner layer 40 contiguous to butt 71; an exterior surface 42 of inner layer 40, surface contiguous to inner surface 51 of middle layer 50, and a Velcro (Reg. Trademark) Hook structure 43 or equal; (2). A middle layer 50 comprised of tough, durable, tuff-stuff or equal type of material with an inner surface 51 of middle layer 50, surface 51 contiguous to exterior surface 42 of inner layer 40 and an exterior surface 52 of middle layer 50, surface contiguous to inner surface 61 of outside layer 60 contiguous to exterior surface 52 of middle layer 50; (3). An outside/exterior layer 60 comprised of durable material such as vinyl, canvas or the like with an inner surface 61 of outside layer 60 contiguous to exterior surface 52 of middle layer 50 and with an exterior surface 62 of outside layer 60 exposed to atmosphere and further having a Velcro (Reg. Trademark) loop structure 63 or equal; (4). An edge means for connecting the three layers 35 such a sewing, adhesive or the like; and (5). an elastic strap 53 with end 32 and end 33, the strap 53 having a means to connect to the three layers 35 a one end and a female snap 54 at the opposite end; (b) a tether strap 36 and loop 37; and (c) a means for connecting the tether strap 36 to the layers 35 wherein the general device 31 is wrapped around a butt 71 of a gun 70 and secured with Velcro and snaps and the device 31 may be connected to a tree/tree stand 90 by the tether strap 36 and loop 37 to safely secure the gun 70.

FIGS. 6A through 6H are sketches of the hunter safety gun wrap device 31 showing operation and use views. The operation views show the following components and features: general hunter safety gun wrap device 31 and more particularly a hunter safety device and system for rifles and shotguns called "Never Drop"; a tether strap 36; a loop 37 on tether strap 36; an inner surface 41 of inner layer 40 contiguous to butt 71; a Velcro (Reg. Trademark) Hook structure 43 or equal; an exterior surface 62 of outside layer 60 exposed to atmosphere; a long or bulky types of weapons and equipment 70 for example, and not as limitations, the following: rifles, shotguns, long bows, cross bows, telescopes and game spotter, cameras and spotlights; a butt 71 of rifle or shotgun 70 or part of the protected equipment; the muzzle 72 of weapon 70; the ground 90; a tree or tree stand 91; and a distance D from muzzle 72 to ground 90.

Succinctly, the operation is: the device 31 is opened to expose the inner surface 41 of inner layer 40 contiguous to butt 71. Then the butt 71 of the rifle 70 is laid against the inner surface 41. Next the device layers 35 wrap-a-round and envelope the butt 71. Here it is important to mate up the Velcro system 43, 63. Next the elastic strap 53 is further extended to couple the male 80 and female 54 snaps—providing a snug and secure back-up to the Velcro system 43, 63. The device 31 is now secured to the rifle 70 around its butt 71. The rifle 70 is carried to the point of use (tree or tree stand 91). Next, the hunter climbs the stand or tree 91 with the rifle 70 and the attached device 31. Next the hunter attaches the strap tether 36 to the tree or tree stand. The tether strap 36 with its loop 37 is attached to the tree/tree stand such that the muzzle 72 of the gun 70 is at least a distance D from the ground 90 when the tether strap 36 is fully extended. Now the hunter may hunt with the gun 70 safely secured. The weapons and equipment suite for use with this device 31 are long or bulky types for example, and not as limitations, the following: rifles, shotguns, long bows, cross bows, telescopes and game spotter, cameras and spotlights.

With this description it is to be understood that the hunter safety device and system 31 for rifles and shotguns called "Never Drop" is not to be limited to only the disclosed embodiment of product. The features of the device 31 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A hunter safety device and system (31) for weapons and equipment called "Never Drop" that is comprised of:
    (a) a set of three layers (35) of the device (31), the three layers (35) further comprising:
        (1). an inside layer (40) comprised of a non-slip material with an inner surface (41) of the device (31) that is placed contiguous to a butt (71) of a weapon or equipment (70), an exterior surface (42) of the device (31) which is contiguous to an inner surface (51) of a middle layer (50) of the device (31), and a closing mechanism;
        (2). the middle layer (50) comprised of a tough, durable, material with an inner surface (51) which is contiguous to the exterior surface (42) of the inner layer (40) and an exterior surface (52) of the middle layer (50) which is contiguous to an inner surface (61) of an outside layer (60);
        (3). the outside/exterior layer (60) comprised of durable material with the inner surface (61) of the outside layer (60) contiguous to the exterior surface (52) of the middle layer (50) and with an exterior surface (62) of the outside layer (60) exposed to atmosphere and further having another closing mechanism (63);
        (4). A means (34) for connecting the set of three layers (35)—the inside layer (40), the middle layer (50), and the outside layer (60) at an edge of each respective layer; and
        (5). an elastic strap (53) with an end (32) and an opposite end (33), the strap (53) having a closure mechanism means for connecting to the set of three layers (35) at one end and a female snap (54) at the opposite end;
    (b) a tether strap (36) and loop (37); and
    (c) a means (38) for connecting the tether strap (36) to the set of layers (35)
    wherein the hunter safety device and system (31) is wrapped around a butt (71) of a weapon or equipment (70) and secured with Velcro and snaps and the device (31) can be connected to a tree/tree stand (90) by the tether strap (36) and loop (37) to safely secure the weapon or equipment (70) once the hunter is in the tree or tree stand.

2. The hunter safety device and system (31) according to claim 1 wherein the weapons and equipment is selected from the group consisting of rifles, shotguns, long bows, cross bows, telescopes and game spotter, cameras and spotlights.

3. The hunter safety device and system (31) according to claim 1 wherein the non-slip material of the inside layer (40) is selected from the group consisting of thin, solid natural rubber; thin, solid synthetic rubber; open crisscross solid natural rubber; open crisscross synthetic rubber; open sticky composite material; thin and ribbed solid natural rubber; thin and ribbed solid synthetic rubber; thin and ribbed solid composite materials.

4. The hunter safety device and system (31) according to claim 1 wherein the closing mechanism (43) is selected from a group consisting of Velcro (Reg. Trademark) hook and loop, snaps, clasps, and hook and eye components.

5. The hunter safety device and system (31) according to claim 1 wherein the tough, durable material of the middle layer (50) is selected from a group consisting of a durable composite thin sheet and a thin nylon sheet.

6. The hunter safety device and system (31) according to claim 1 wherein the durable material of the outside/exterior layer (60) is selected from the group consisting of sheet vinyl, canvas, thin sheet composite material and thin sheet nylon material.

7. The hunter safety device and system (31) according to claim 1 wherein the another closing mechanism (63) is selected from a group consisting of Velcro (Reg. Trademark) hook and loop, snaps, clasps, and hook and eye components.

8. The hunter safety device and system (31) according to claim 1 wherein the means for connecting the set of three layers (35) is selected from the group consisting of sewing, adhesive, and ultrasonic welding.

* * * * *